Oct. 7, 1924.

J. W. ORR 1,510,746

EMERGENCY BRAKE FOR AUTOMOBILES

Filed Jan. 9, 1924    2 Sheets-Sheet 1

Inventor
James W. Orr
By
His Attorney

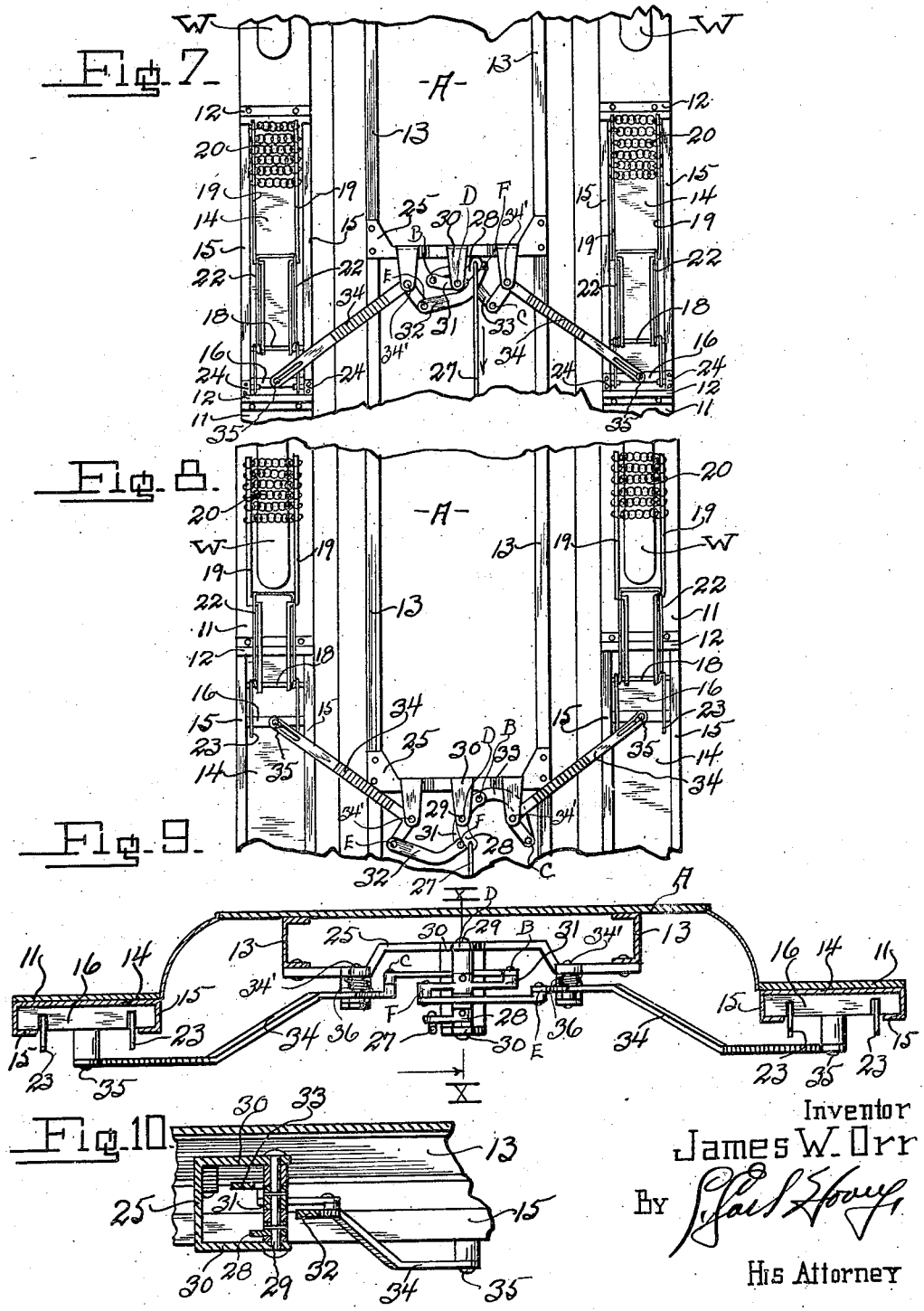

Patented Oct. 7, 1924.

1,510,746

UNITED STATES PATENT OFFICE.

JAMES W. ORR, OF KANSAS CITY, MISSOURI.

EMERGENCY BRAKE FOR AUTOMOBILES.

Application filed January 9, 1924. Serial No. 685,200.

*To all whom it may concern:*

Be it known that I, JAMES W. ORR, a citizen of the United States, residing at Kansas City, in the county of Jackson and State of Missouri, have invented certain new and useful Improvements in Emergency Brakes for Automobiles, of which the following is a complete specification.

The present invention relates to emergency brakes for automobiles, and provides a brake for use in connection with wheeled vehicles in general. The primary object of the invention is the provision of an emergency brake for automobiles, which is to be used in addition to the customary traction wheel brake, wherever the operator deems it advisable or necessary.

Another object of this invention is to provide an improved form of emergency brake that is simply and quickly operated, will be cheap to make and easily attached to any make or style of automobile.

A still further object of the invention is to provide a device of the character mentioned that will be an improvement upon, and of value in manufacturing, the emergency brake for motor vehicles as described and claimed in my Patent Number 1,470,098, issued October 9, 1923.

In its preferred form, the emergency brake is built in compact form, so as to take up as little space as possible when attached to the running board of an automobile. However the design used for illustration is only one specific form, especially with regard to the compact lever structure, and it is understood that many other arrangements of details can be made without departing from the scope of the invention.

In the drawings:—

Fig. 7 is a bottom plan view of the emergency brake, and its operating levers, in the housed or closed position.

Fig. 8 is a similar view of the device with the brake in a functioning position and the operating levers open.

Fig. 9 is a transverse section of the lower part of an automobile taken on a line just forward of the operating levers, and looking toward the rear, and Fig. 10 is a fragmentary view taken on line X—X of Fig. 9.

Referring now to the drawings in detail, wherein similar reference characters refer to like parts throughout the several views, the letter A designates an automobile to which the emergency brake has been affixed for the purpose of acting upon each of the rear wheels W.

The emergency brake is preferably carried under the running boards 11 and removably attached thereto by a pair of spaced apart transverse grooves formed by the rigid attachment of angle irons 12 which may be continued the entire width of the automobile and, if desired, braced by further attachment to the channels of the chassis 13.

Figure 3:
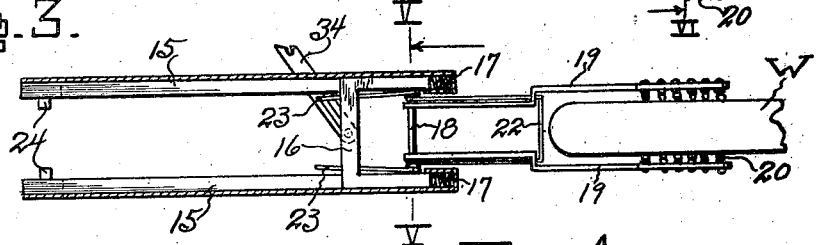
Fig. 3 is a section taken on line III—III of Fig. 2, looking in the direction of the arrow.
Figure 5:
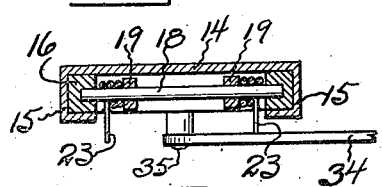
Fig. 5 is an enlarged detail section taken along line V—V of Fig. 3.
Figure 4:
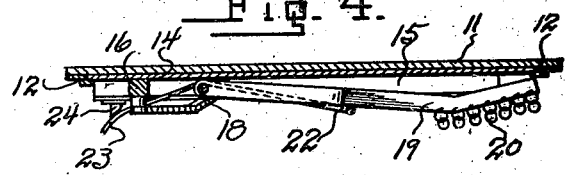
Fig. 4 is a longitudinal vertical central section of the brake in a housed position.
Figure 6:
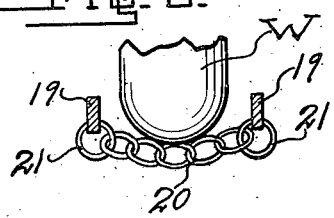
Fig. 6 is a section on line VI—VI of Fig. 2 showing the chain shoe construction.

Plate 14 constructed to form a pair of parallel spaced apart channels 15, by having its sides bent downwardly and inwardly, provide means for reciprocably supporting a yoke 16 which travels over a major portion of the length of channels 15 when the emergency brake is operated. Plate 14 projects beyond the channels at each end to allow engagement with angles 12. Channels 15 are also closed at their rearward ends (as shown in Fig. 3) to accommodate buffer springs 17 which tend to bring yoke 16 to a more gradual stop when the brake is employed.

Yoke 16 carries a transverse rod 18 upon which a pair of spaced parallel shoe carrying arms 19 are pivoted at their forward end. These arms 19 are spaced apart to straddle the rear wheel W and carry, at their rearward end, a shoe 20 which is preferably made up of cross chains connected directly to the arms by rings 21.

Figure 1:
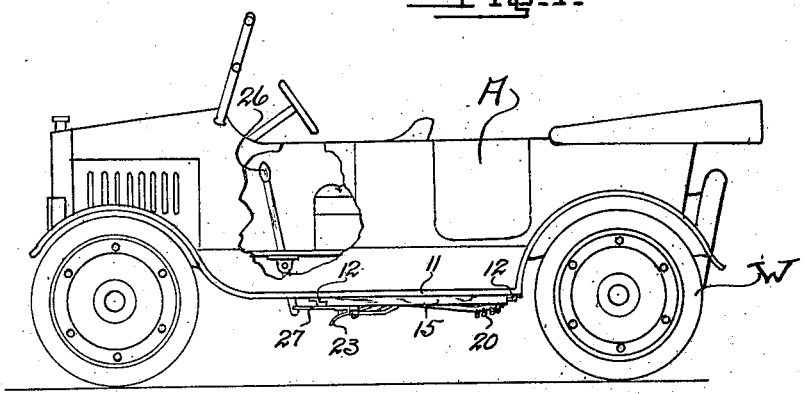
Figure 1 is a side elevation of an automobile with the improved form of emergency brake in a housed position.
Figure 2:
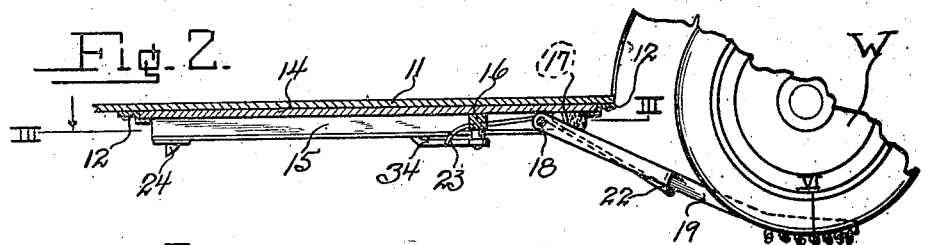
Fig. 2 is a longitudinal vertical central section of the brake in a functioning position.

Means for bringing and holding the brake shoe 20 and arms 19 into housed or inoperative position may be constructed by using a large U shaped rocker rod or spring 22 which engages the shoe arms 19 intermediate its ends, passes to rod 18 and is loosely wrapped thereabout to form a coil spring which tends to constantly lift the shoe arms. The two ends of the U-shaped rocker rod or spring 22 extend forward and beneath yoke 16, terminating in downwardly curved ends 23 as shown in Fig. 2.

Inclined lugs 24 supported by each of the two channels directly opposite each other and in the line of travel of rocker rod or spring 22, at a proper predetermined distance to the front to allow complete disengagement of shoe 20 and wheel W, and engage the curved ends 23 shortly before yoke 16 completes its forward travel. This action forces curved ends 23 downwardly, tightens the coils about rod 18 and forces the rear end up, which carries shoe arm 19 and shoe 20 into a housed position suitable for carrying.

In using the emergency brake, the opposite action takes place and, with the gripping of wheel W by the first cross chain, when the device is forced to the rear, the shoe is immediately snapped into place beneath the rear wheels.

To operate the emergency brake, which consists primarily of forcing yoke 16 along channels 15, a series of levers carried by a cross-frame bracket 25 are centrally located beneath the car and actuated by a hand lever 26 and spring 36, the hand lever being placed within easy reach of the driver of the automobile.

Connecting rod 27 couples hand lever 26 with actuating lever 28, which is pinned to a vertical shaft 29, pivotally supported by spaced ears 30 of brackets 25.

A twin lever 31, also pinned or rigidly attached to shaft 29 carries a pair of substantially arcuate levers 32 and 33 at each of its ends. These arcuate levers pass on opposite sides of shafts 29 and their remote ends travel in opposite directions, when shaft 29 is rotated by actuating lever 28.

The remote or opposite ends of levers 32 and 33 are pivotally connected to one end of right angle yoke levers 34 which are each pivotally carried, equidistant from the center as at 34', by bracket 25, and are identical in shape. Their outer ends are slotted and connected to yoke 16 by pivot pin 35. This slot allows an arcuate path to be described by the outer end of lever 34, yet forces yoke 16 along the straight line of channels 15.

When the levers are closed, and the brake shoe housed as shown in Fig. 7, pivot points B, C, E and F are in a locked position beyond dead center, with relation to pivot point D. This position is taken against the tension of coil spring 36 which may be placed at the point 34'. One end of spring 36 is preferably rigidly attached to some part of bracket 25, while the other end is fastened to lever 34. This spring 36 is carried under high tension and imparts quick action to the brake mechanism through lever 34 immediately after lever 26 and rod 27 has carried points B, C, E and F behind dead center, and out of a locked position.

Returning the operating means again tightens spring 36, and the device is ready for the next emergency.

A trigger mechanism may be interposed between operating lever 26 and the series of levers whereby the device may be operated without quick and dangerous backward movement of said lever.

This leverage is compactly arranged and has proven highly desirable in operating the emergency brake. Fig. 7 and Fig. 8 clearly illustrate the relative positions taken by all the levers.

It will thus be seen that I have devised a comparatively simple, compact and efficient arrangement and construction for fulfilling the desired object of the invention, and while I have illustrated what now seems to constitute the preferred form of construction, I desire to reserve the right to make such changes or modifications as may fairly fall within the scope of the following claims.

What I claim is:

1. An emergency brake for automobiles, comprising a brake shoe, arms carrying said shoe, a slidably mounted yoke carried by the automobile, said arms being pivoted on the yoke, manually operated means adapted to place the brake shoe in operative position, and means adapted to hold said brake shoe in housed position; said first means including a pivotally mounted arm operatively connected to said yoke, and a series of levers connecting said pivotally mounted arm with an operating handle.

2. An emergency brake for automobiles, comprising a brake shoe, arms carrying said shoe, a slidably mounted yoke carried by the automobile, manually operated means adapted to place the brake shoe in operative position, and means adapted to hold said shoe in housed position; said first means including a pivotally mounted arm operatively connected to said yoke.

3. An emergency brake for automobiles, comprising a brake shoe, arms carrying said shoe, a slidably mounted yoke carried by the automobile, said arms being pivoted on the yoke, manually operated means adapted to place the brake shoe in operative position; said first means including a pivotally mounted arm operatively connected to said yoke, a series of levers connecting said pivotally mounted arm with an operating handle and limiting buffer springs positioned in the path of said slidably mounted yoke.

4. An emergency brake for automobiles, comprising a brake shoe, arms carrying said shoe, a slidably mounted yoke carried by the automobile, said arms being pivoted on the yoke, manually operated means adapted to place the brake shoe in operative position, housing means; said first means including a pivotally mounted arm operatively connected to said yoke, a series of levers connecting said pivotally mounted arm with an operating handle and limiting buffer springs positioned in the path of said slidably mounted yoke, said housing means including a plate having integral parallel channels, and lifting means for said shoe and supporting arms.

5. An emergency brake for automobiles, comprising a brake shoe, arms carrying said shoe, a slidably mounted yoke carried by the automobile, said arms being pivoted on the yoke, manually operated means adapted to place the brake shoe in operative position, housing means; said first means including a pivotally mounted arm operatively connected to said yoke, a series of levers connecting said pivotally mounted arm with an operating handle, and limiting buffer springs positioned in the path of said slidably mounted yoke, said housing means including a plate having integral parallel channels, and lifting means for said shoe and supporting arms comprising inclined lugs carried by said channels, a rocker fulcrumed at the pivotal point of the shoe carrying arms, said lugs being positioned to operate said rocker during a portion of the rectilinear movement of said yoke.

In testimony whereof I hereunto affix my signature.

JAMES W. ORR.